US012606416B2

(12) United States Patent
Jussila et al.

(10) Patent No.:   US 12,606,416 B2
(45) Date of Patent:       Apr. 21, 2026

(54) METHOD FOR AIDING OR MANAGING A RESCUE OPERATION

(71) Applicant: KONE Corporation, Helsinki (FI)

(72) Inventors: Ari Jussila, Helsinki (FI); Matti Leino, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1389 days.

(21) Appl. No.: 17/306,145

(22) Filed: May 3, 2021

(65) Prior Publication Data

US 2021/0395041 A1       Dec. 23, 2021

(30) Foreign Application Priority Data

Jun. 18, 2020    (EP) ..................................... 20180700

(51) Int. Cl.
*B66B 5/02*          (2006.01)
*B66B 1/34*          (2006.01)
(Continued)

(52) U.S. Cl.
CPC ............ *B66B 5/027* (2013.01); *B66B 1/3461* (2013.01); *B66B 9/00* (2013.01); *G06F 3/14* (2013.01)

(58) Field of Classification Search
None
See application file for complete search history.

(56) References Cited

U.S. PATENT DOCUMENTS

2003/0192746 A1* 10/2003 Suzuki ................. B66B 5/0037
                                                    187/391
2007/0261924 A1* 11/2007 Lindberg ............... B66B 5/027
                                                    187/391
2008/0202859 A1*  8/2008 Tegtmeier .............. B66B 5/027
                                                    187/288

FOREIGN PATENT DOCUMENTS

EP          1 809 560       7/2007
EP          2 448 853       5/2012
(Continued)

OTHER PUBLICATIONS

Dou, Yan, et al. "Design of emergency response control system for elevator blackout." International Workshop of Advanced Manufacturing and Automation. Singapore: Springer Singapore, 2019. (Year: 2019).*

(Continued)

*Primary Examiner* — Emmett K. Walsh

(74) *Attorney, Agent, or Firm* — Birch, Stewart, Kolasch & Birch, LLP

(57)                ABSTRACT

A method for aiding or managing a rescue operation in an elevator system includes at least one elevator having a car driving in an elevator runway having several floors, and an elevator control which gathers data of components of the elevator system and issues a failure signal in any case of failure situation in the elevator system leading to a stop of the car between the floors. In the method it is checked based on first sensor data, whether a person is trapped in the car, and based on the first data or manually a rescue managing process is started, using a rescue managing circuit connected to the elevator control. The rescue managing process includes a pre-rescue process in which following data is read from sensors and/or components of the elevator system: car position data, status data of the elevator system and of the elevator components, functional data of the elevator system (Continued)

Figure 1:
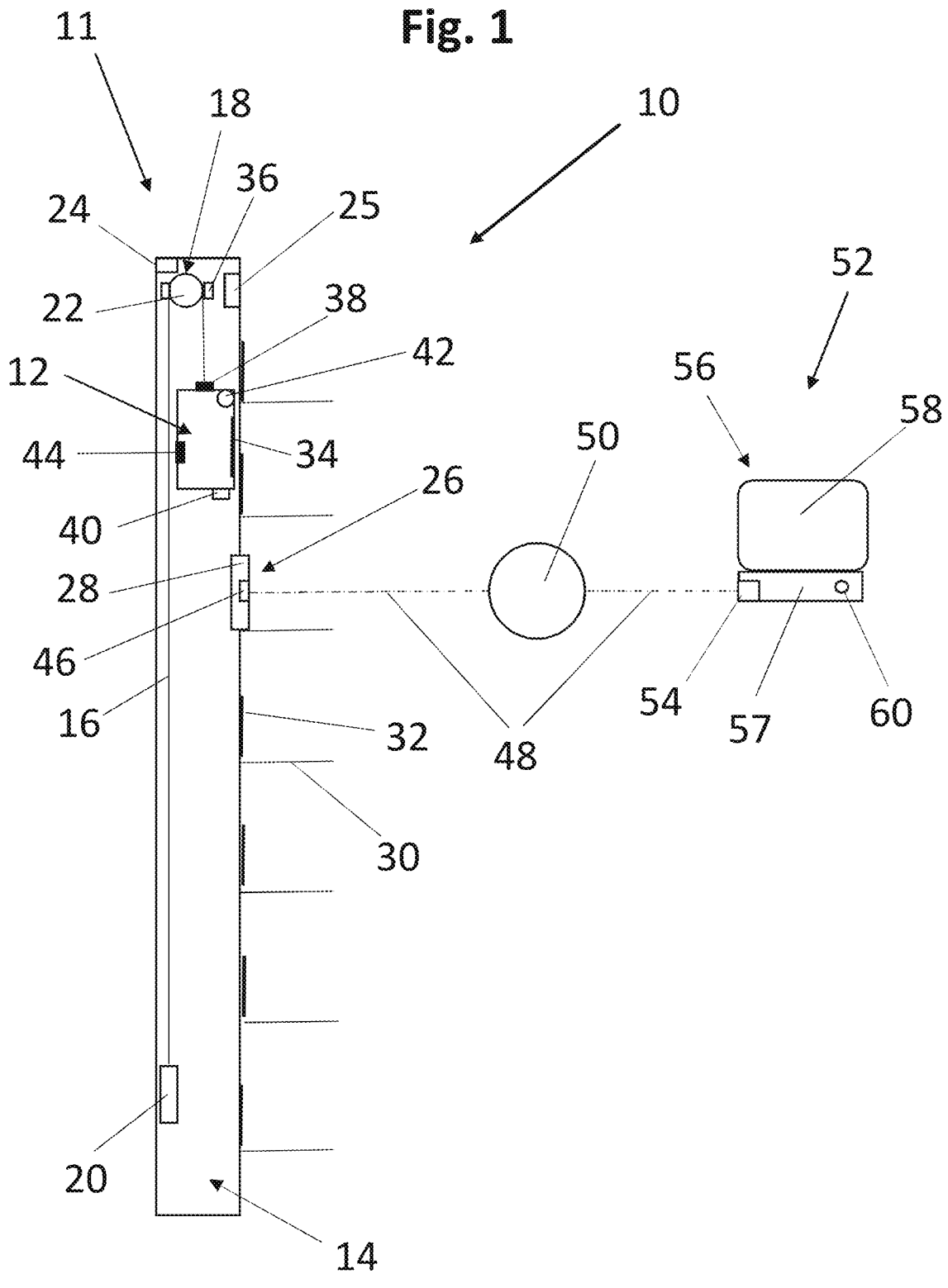

and/or of the elevator components, which functional data is obtained from the elevator control and/or from sensors connected to the elevator system. From these data presentation data are generated and displayed on a display connected to the rescue managing circuit and/or to the elevator control in preparation of a manual or automatic rescue drive.

20 Claims, 2 Drawing Sheets

(51) Int. Cl.
   B66B 9/00        (2006.01)
   G06F 3/14        (2006.01)

(56)             References Cited

FOREIGN PATENT DOCUMENTS

| | | | |
|---|---|---|---|
| EP | 3 459 888 A2 | 3/2019 | |
| JP | 4-235881 A | 8/1992 | |
| KR | 100975758 B1 * | 8/2010 | ............ B66B 5/021 |
| WO | WO 2006/048497 A1 | 5/2006 | |
| WO | WO 2011/001197 A1 | 1/2011 | |

OTHER PUBLICATIONS

European Search Report issued in EP 20180700.5, dated Dec. 4, 2020.

* cited by examiner

METHOD FOR AIDING OR MANAGING A RESCUE OPERATION

The present invention relates to a method for aiding or managing a rescue operation in an elevator system comprising at least one elevator car driving in an elevator runway having several floors. The elevator system further comprises an elevator control which gathers data of components in the elevator system and issues a failure signal in any case of failure situation in the elevator system leading to a stop of the car between the floors.

Traditionally, a field technician goes to the elevator site and opens the hoisting machinery brakes with a manual brake lever, allowing drifting of elevator car to a landing by means of gravity. This solution will of course work only with an unbalanced car load. With a balanced load a separate hoist, such as a Tirak is additionally needed for moving the elevator car. This kind of rescue operation is slow and labour-intensive.

Therefore, solutions for manual electronic brake opening, as well as for automatic rescue operation have also been developed. In those solutions, the hoisting machinery brakes (in manual electronic brake opening) and additionally the hoisting motor (in automatic rescue operation) may be energized by a battery-operated rescue device to move the car.

Currently in this case, a technician drives to the site of the elevator system and releases the trapped passengers whereby he uses information in the control of the elevator system as for example the information about the fact that the state of the elevator safety chain permits a rescue drive operation. Furthermore, when manually or automatically performing a rescue drive the technician drives, e.g. via pressing a manual drive button in the control panel, the elevator car to the next landing. During this activity he is aided by landing zone indicator which lights up when the elevator car has reached the landing zone and correspondingly the trapped passengers can be released. After lighting of the landing zone indicator, the technician may release the manual drive button and the car doors and landing doors can be opened automatically or manually according to the system.

As nowadays not only the general layouts of different elevator systems differ more and more but also a variety of different elevator components are used in one specific elevator system, e.g. different elevator motors, motor drives, different elevator brakes and brake drives as well as different control systems, it is more and more difficult for a technician to handle the automatic or manual rescue drive as the different systems and components require a different handling for a rescue ride. Accordingly, performing a rescue drive requires a lot of knowledge and expertise from the technician.

A method according to the preamble of claim 1 is known from WO 2006/048497 A1.

It is thus object of the invention to provide an aid for the technician to perform an automatic or manual rescue drive which does not require such a deep knowledge of the technician. Furthermore, it is object of one embodiment of the invention to enable the technician to perform a rescue drive in a remote location as for example a service center without needing to visit the site of the elevator system personally.

This object is solved with a method according to claim 1 as well as with an elevator system according to claim 10. Advantageous embodiments of the invention are subject-matter of the dependent claims. Preferred embodiments of the invention are also shown in the description as well as in the drawings.

In the inventive method it is checked based on first data, whether a person is trapped in the car, and based on the first data or even manually a rescue managing process, for example a rescue drive or the preparation therefore, is started. The rescue managing process uses a rescue managing circuit connected to the elevator control. This rescue managing circuit may be a component which is located in the vicinity of the elevator control as for example a module of the elevator control so that the rescue managing circuit may be integrated in the elevator control itself. The rescue managing circuit may also be a device which is located on a remote location, for example on a remote service center, and which is able to communicate with the elevator control via a public communication network, for example Internet. It may also be located in a mobile device, for example in a service-computer of the technician which is connected with the elevator control in a remote location or on-site.

The rescue managing process comprises a pre-rescue process in which first at least the car position data is read as first data from at least one sensor of the elevator system. These position data are essential as they indicate where the people are trapped in the elevator car. The first data which enable the system and/or the technician to evaluate whether passengers are trapped in a car may also comprise car load data, car video data transferred by a video camera located in the elevator car and/or car audio data which is for example obtained via an emergency audio communication with an audio interface located in the elevator car enabling trapped passengers to communicate with a service center. One of these first data or any combination of these data can be used to determine the fact that an elevator car which has stopped between two floors really comprises trapped passengers.

The second data needed for the pre-rescue process and/or the rescue process itself comprise the status data of elevator components. These status data comprise for example the car load, which informs about how many persons are presumably trapped in the elevator car and which data informs whether the car is going to move upwards or downwards by gravity or being balanced in a situation when the elevator brakes are released.

The next relevant status data comprise the position of the closest floor. This data informs the technician in connection with the position of the car which distance has to be travelled to release the trapped passengers in a rescue drive.

Further relevant status data may comprise the type data of different elevator components, for example the elevator (system) type, the elevator motor type, the elevator motor drive type, the elevator rescue device type, the hoisting machinery brake type, a load status of a backup power supply and maybe the general layout of the elevator system, meaning how many cars are connected to the elevator system and which of the cars is having a failure situation which necessitates a rescue drive. All these data enable the technician and/or the rescue managing circuit (RMC) to specify the particulars of the elevator system in preparation of a rescue drive.

Third data are needed to perform and monitor a rescue drive. These third data are the functional data of elevator components. These functional data are obtained particularly from safety-relevant elevator components which include one or more of the following components: elevator brakes, motor drive, elevator motor, safety chain, floor doors, car door, mains input, gripping device, elevator control, backup power supply, and data connection.

These functional data show to the rescue managing circuit and/or to the technician which of these safety-relevant elevator components is working properly or not to enable the performance of the upcoming rescue drive, because there are some functional obligations which have to be fulfilled by some safety relevant elevator components before being able to move the elevator car in a rescue drive. For example, the safety chain or at least a selected section of the safety chain be "on", meaning all safety switches of the safety chain have to be closed. Otherwise, it is not possible to move the elevator car at all. The safety chain for example ensures that all floor doors and the car door is closed ensuring that people in the elevator are on the landing floors are not harmed by moving the elevator car in a rescue drive. Furthermore, it is obligatory that the elevator brakes as well as the brake drive are able to work in order to start the rescue drive. Also the function of the gripping device and the overspeed governor has to be okay. By checking the mains input it is possible for the rescue managing circuit or for the technician to gather whether the trapping of the passengers may be caused by a power breakdown, in which case the car may be moved in a rescue drive via a backup power supply of the elevator system which is a battery or accumulator enabling the feeding of power to all essential elevator components as drives, controls, safety circuits to enable the performing of rescue drives with all elevators of the elevator system.

If the whole rescue drive is going to be managed from a remote location, for example from a remote service center, also the function of the data connection between the service center and the elevator system has to be ensured. In this case, the function of the data connection can be ensured by certain techniques which will be described later on. Preferably, the data connection between the remote location and the elevator system is encrypted to avoid any affecting of the data connection by third parties.

All first, second and third data are gathered by the rescue managing circuit and some of them are processed into presentation data which is displayed on a display connected to the rescue managing circuit or to the elevator control for preparing and/or performing of a manual or automatic rescue drive.

The display may be located in connection with a control panel of the elevator control of the elevator system. The display also may include a display of a mobile device carried by the technician, e.g. a notebook or a smartphone. The display may also be located in a remote service center which services several elevator systems spread over a certain region.

Via the inventive method, all the necessary information giving a clear image of the type and size and function of the elevator system as well as the situation of the trapped passengers is presented to the technician or the rescue managing circuit automatically. The presented data also gives information about the reason of the failure situation, for example if the mains power is off or if a function of an elevator component is hampered. This means that based on this automatically presented information, the technician does not need to have a deep knowledge of the system in question because he has not to gather the information from the system manually. Accordingly, the technician—without needing to have a deeper understanding of the particular elevator system—can now safely start a rescue drive manually or automatically. In case of a manual rescue drive, the technician uses a manual brake lever or pushes a button at the elevator control panel or at his mobile device or in the remote location. Upon pushing the button the elevator brakes are released which leads to a movement of the elevator car in case of an unbalanced situation. If a balanced situation prevails meaning that the loaded elevator car and the counterweight have about the same weight, also the motor drive is energized to actively move the elevator car to the next floor.

The movement of the elevator car is in any case supervised by the overspeed governor which instantly shuts down the movement in case of essential overspeed by de-energizing the elevator motor and de-energizing the elevator brakes and activating the gripping device. Preferably, the car speed is monitored and the car speed may be slowed down by according activation of brakes and elevator motor without activating the gripping device, because after activation of a gripping device the car can only be freed by a technician on site.

According to the invention, the functional data of the elevator components are compared with stored reference values representing different types of failure situations in the elevator system, whereby from the comparison result, failure situation data are analysed which failure situation data are generated as presentation data to be displayed on the display. In this advanced method, the technician also gets an information about the reason of the failure situation, for example a power breakdown, an earthquake, an excessive rope swing or other functional problems of the elevator system. This facilitates the planning of the upcoming rescue drive and also provides information whether the failure situation allows performing a rescue drive at all. For example, if the elevator car has been stopped by the action of the gripping device, a manual or automatic rescue drive from a remote location is not possible because the elevator car has to be drawn from the gripping wedges.

In a preferred embodiment of the invention, the rescue managing process comprises a run-time rescue process aiding the release of trapped passengers by continuously obtaining real-time data on at least two of the following parameters: car position, car speed, movement direction of the car, distance to the approaching floor, reaching of landing zone, whereby from these parameters, presentation data are generated by the rescue managing circuit which real-time data is displayed on the display used by the technician.

Therefore, the technician is during his manual or automatic rescue drive provided with all necessary information allowing him to monitor the approach of the elevator car to the next landing and the reaching of the landing zone in which case he can stop in a manual rescue drive the movement of the elevator car by releasing the manual rescue drive button. An automatic rescue drive generally provides for an automatic stop of the car in the landing zone and automatic opening of the car doors and floor doors after the car has stopped in the landing zone. Here the rescue managing circuit manages the whole ride of the elevator car to the nearest landing. Anyway, the technician can supervise the whole process of the automatic rescue drive and in any case of anomaly, for example excessive car speed or failure of elevator components, may stop the automatic rescue drive. Preferably, the read real-time data provide a signal for dropping the elevator brakes when the elevator car has reached the landing zone which enables the technician to release the manual drive button and which enables the automatic drive system to de-energize the elevator brakes to stop the elevator car.

The invention also relates to an elevator system comprising at least one car driving in an elevator runway having several floors and comprising an elevator control which gathers data of components of the elevator system and is configured to issue a failure signal in any case of a failure situation in the elevator system leading to a stop of the elevator car between the floors. According to the invention, the elevator system comprises a rescue managing circuit RMC which is connected to the elevator control and the elevator control is connected with at least one first sensor informing the control about first data concerning the presence of passengers in the stopped car. This first sensor may be a load sensor, a camera in the elevator car or an audio interface with the elevator car allowing a voice communication with trapped passengers.

In case of trapped passengers, the RMC is configured to be started either manually or automatically dependent on the signal of the first sensor to read out data from sensors and/or from components of the elevator system, comprising first data as car position data and data about trapped passengers, second data, i.e. status data of elevator components as well as third data, i.e. functional data of elevator components from the elevator control and/or from sensors connected to the elevator system. The RMC is configured to generate presentation data of all these data and to transfer or to provide the presentation data for being displayed a display connected to the rescue managing circuit or elevator control in preparation of a manual or automatic rescue drive. The display may be located in connection with the control panel of the elevator or a display of a mobile device or a display in a remote service station, which are able to communicate with the elevator control via a public communication network, e.g. internet. This elevator system enables a technician to provide a rescue drive without necessitating a deep knowledge of the elevator system in question. Based on the presentation data on his display, he is able to smoothly perform a rescue drive maintaining a high level of safety. For the characteristics and advantages of the inventive elevator system it is referred to the above-described inventive method.

As it has been carried out before, the RMC may be integrated in the elevator control or may be located in a mobile device of the technician or even may be located in a remote service center which is connected to the elevator control via a public communication network.

In a preferred embodiment of an elevator system, the RMC comprises a run-time module aiding the release of trapped passengers by continuously obtaining real-time data on at least two of the following parameters: car position, car speed, movement direction of the car, distance to approaching floor, whereby this run-time module of the RMC is configured to generate presentation data of these parameters for being displayed on a display connected with the elevator control or RMC. In this case, the rescue managing circuit is able to perform an automatic rescue drive under supervision of the real-time data ensuring a safe movement of the elevator car along the distance of the rescue drive to the next floor. Of course, the technician is able to supervise with this real-time data that the manual or automatic rescue drive is running smoothly and according to plan and within the set speed limits (which are in case of a rescue drive below the nominal drive speed of the elevator).

In a preferred embodiment of the invention, the RMC is connected to the elevator drive and/or to the elevator brake drive and is configured to perform an automatic rescue drive based on the real-time data, particularly with automatic dropping of the elevator brakes when the landing door has been reached. In this case, the technician only has to supervise that the automatic rescue drive managed by the RMC is running smoothly. Of course, he is able to intervene at any moment by pressing a stop button which immediately de-energizes the elevator drive as well as the elevator brake drive and leads to the stop of the elevator motor and to a gripping of the elevator brakes. Thus, although the whole rescue drive is performed without any interaction needed, the technician is always supervising the whole process to be able to intervene in any case of upcoming danger which is for any reason not detected by the system.

Preferably, the elevator system, particularly the RMC, comprises an analysis unit having a reference memory with reference values representing functional data of elevator components in correlation to different types of failure situation in the elevator system. The RMC in this case further comprises a comparator configured to compare the actual functional data of the elevator components with the stored reference values to derive failure situation data, which is generated as presentation data to be displayed on the display. This improved embodiment of the invention adds a certain intelligence to the RMC which enables it to automatically analyse the prevailing failure situation and get a reason for the failure situation which is then presented to the technician. Thus, the RMC is able to provide the technician with data about the type of failure situation which again enables the technician to better meet the requirements for a particular rescue drive.

It may be summarized that the present invention provides a great help for technicians to prepare and to perform manual or automatic rescue drives either on site of the elevator system or even in a remote service center far away from the elevator system in question. This provides a great improvement of elevator safety as it is possible to release passengers immediately after a failure situation has evolved. It is highly advantageous that the passengers do not need to wait for the arrival of the technician on the site of the elevator system, but that after a failure signal has been sent from the elevator system to a remote location, the rescue drive of the elevator system can immediately be started from the remote location either automatically or manually. This technology therefore highly improves the reliability of the elevator system and the faith of passengers into the elevator system as they realize that even in a trapping situation, a release is only a matter of minutes and not of hours.

In case of a rescue drive from a remote location the quality of the data connection is an essential feature for the whole process. The quality can be ensured by bi-directional handshaking. By integrating a certain number of handshake signals the monitoring can be adjusted in a way that very short interruptions are not considered.

Following terms are used as synonyms: rescue drive—emergency drive; first data—data concerning the trapping of passengers in the car as car position and car load data and/or audio- and/or video data of the car; second data—status data; third data—functional data;

The invention is hereinafter described schematically by aid of the enclosed drawings. In these drawings FIG. 1 shows a diagram of an elevator system which is connected via a public communication network to a remote service center where a technician is able to perform a rescue drive without being on site of the elevator system, and FIG. 2 a detailed view of the display of the remote service center of FIG. 1 showing the presentation data provided by the RMC for aiding the technician for preparing and performing a manual or automatic rescue drive.

FIG. 1 shows an elevator system 10 comprising at least one, usually several elevators 11 with at least one elevator car 12 driving in an elevator hoistway 14. The car 12 is suspended by hoisting ropes 16 running over the traction sheave of a traction drive machine 18 whereby the other ends of the hoisting ropes 16 are connected to a counterweight 20. The drive machine 18 comprises an elevator motor 22 which is driven by an elevator drive 24 which again is controlled by an elevator control 26 located in a control panel 28. The control panel 28 is in a high-rise elevator located in a machine room or in usual elevators located in the landing zone of a floor. The elevator 11 comprises several floors 30 whereby each floor 30 is separated from the elevator hoistway or elevator shaft 14 by a floor door 32. The elevator car 12 has a car door 34 which is facing a floor door 32 when the elevator stops in a landing zone of a floor 30. The elevator 11 further comprises a safety chain 25 with a plurality of switches, e.g. for each floor door 32 and the car door(s) 34.

The traction sheave drive machine 18 is usually provided with two elevator brakes 36.

Connected with the elevator car 12 are a plurality of sensors, i.e. a load sensor 38, a position sensor 40, a video camera 42 as well as an audio interface 44 for emergency calls enabling trapped passengers to communicate with a service center 52. The elevator control 26 is connected via an interface 46 and via a transmission line 48 with a public communication network 50, e.g. the Internet. Furthermore, the remote service center 52 is connected via a terminal interface 54 with the public communication network 50. The remote service center 52 comprises a service computer 56 having a display 58 and I/O periphery, as for example a push button 60 and/or a keyboard.

Figure 2:
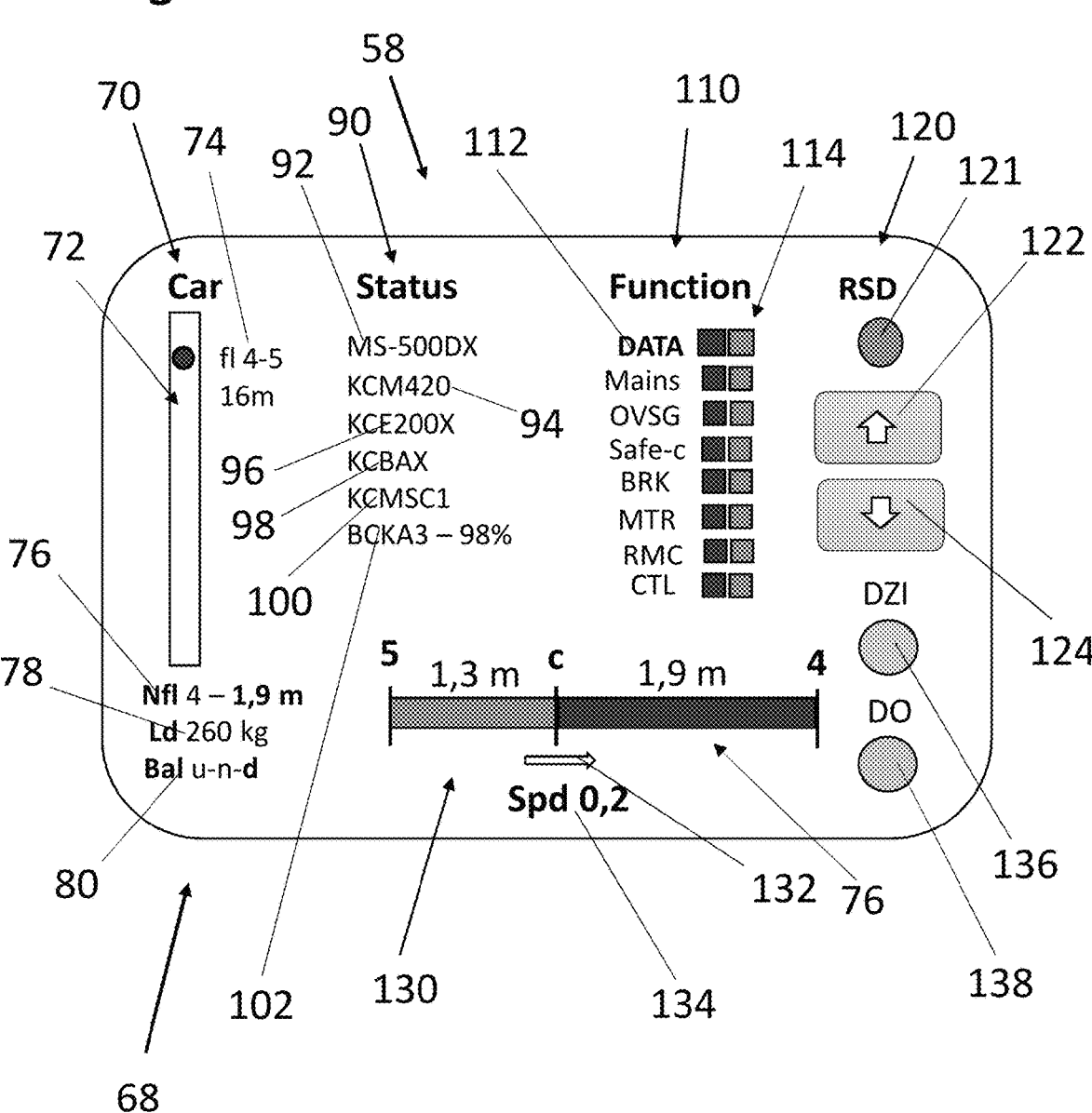

The function of the inventive rescue drive method is described by reference to the elevator system of FIG. 1 and referring to the detailed representation of presentation data 68 on the display 58 of the remote service center 52 as it is shown in FIG. 2.

It is clear for the skilled person that the elevator system in FIG. 1 also has other periphery which is obligatory for elevator systems as for example a call allocation system with call panels for each floor and/or in the car.

The elevator control 26 supervises the proper function of the elevator 11 during the operation of the elevator cars by servicing passengers calls and driving passengers from their departure floor to their destination floor. In case of an anomaly, for example in case of earthquakes or power shortages, excessive rope swing or other reasons, the safety system of the elevator system 10 may initiate a stop of the car travel between two landings. In this case, a failure signal is issued by the elevator control 22 to the remote service center 52. The connection of the control 26 to the service center 52 via the public communication network 50 is preferably encrypted and bidirectional. The failure signal is input via the client interface 54 to a service computer 56 of the remote service center 52 having a remote managing circuit (RMC) 57 and a display 58. Before any action regarding a rescue drive is initiated, it is prompted via the elevator control 26 or via the RMC 57 under use of the load sensor 38 and/or video camera 52 and/or audio interface 44 whether or not passengers are trapped in the stuck elevator car 12. If this is the case, the RMC immediately gathers functional data from the elevator components of the elevator system 10, particularly of the elevator brakes, the motor drive, the elevator motor, the safety circuit, the floor doors, car door, the mains input, gripping device, elevator control, backup power supply, overspeed governor. The RMC does not need the functional data of all of these elevator components but at least of those components which are relevant for performing a rescue drive. For example, the safety chain or at least a selected portion of the safety chain has to be closed, otherwise a movement of the elevator car is not possible.

Furthermore, the RMC gathers status data from the elevator control about the status data of the elevator system meaning the distance of the car to the closest floor, the car load, the position of the closest floor, the elevator drive type, elevator rescue device type, hoisting machinery brake type, load status of the backup power supply and the general layout of the elevator system. This status information about the elevator system 10 enables the RMC to gather a whole picture of the general concept of the elevator system 10 to be presented to the technician via the display 58.

FIG. 2 shows the display 58 of the computer 56 in the remote service center 52. The RMC 57 generates from the above first data, second data (status data) and third data (functional data) presentation data which is now displayed on the display 58. This presentation data comprises car data 70 which car data 70 comprise a graphic illustration 72 of the position of the elevator car in the elevator shaft by displaying the shaft as a longitudinal vertical column and the car as a dot in the column. Furthermore, car data 70 comprises numerical position data 74, particularly between which floors the elevator car is stuck, in this case, between the fourth and fifth floor and the height position of the car in the elevator shaft which is here 16 m, which value is obtained e.g. by the car position sensor 40 in the elevator system 10. Furthermore, the car data 70 comprises distance data 76 regarding the nearest landing in travelling direction which is in the present case floor number 4 and the distance to the landing which is 1.9 m.

Furthermore, the car data 70 comprises car load data 78 which is in this case 260 kg telling that several people are stuck in the elevator. Furthermore, the car data 70 in this example comprises balance data 80 showing the balance situation of the elevator car. In case of an empty elevator car the balance situation is for example up "u" meaning that the car will travel upwards when the brakes are released. A further balance situation is neutral "n" meaning that the car will not move at all when the elevator brakes are released, meaning that the weight of the car and the counterweight does not differ much. Or the balance situation is down as in the present case (as it can be seen by the green lightning of the downwards indicator "d"). Already with this graphical and numerical representation of the car data 70, the technician exactly knows where the car is stuck in the shaft and also distance to the next landing he knows about the load status and about the numbers of the person and the travelling direction of the elevator car in case of release of the elevator brakes. The car data thus comprise a mixture of first data and status data regarding the elevator car.

Furthermore, the presentation data 68 comprises status data 90 (second data) indicating the elevator system type 92, the motor type 94, the elevator drive type 96, the brake type 98, the type of the rescue managing system 100 as well as the type of the backup power supply 102 including its charge status. This is advantageous as the technician does not have to go through manuals provided at the site of the elevator but all the type information of the essential elevator components and of the elevator system itself is immediately presented to him so that he has an idea of the general elevator layout he has to deal with.

The presentation data 68 also comprises functional data 110 (third data) which refer to different safety-relevant elevator components. An indicator behind each component, for example a simple red and green light, displays whether the component is working properly or not. The components here in the embodiment of the FIG. 2 are—from up to below—the functional status of the data connection, of the control, of the overspeed governor, of the safety circuit, of the brake inclusive brake drive, of the motor inclusive motor drive and of the rescue managing circuit itself. The status indication of the data connection ensures that a secure and safe functional data connection is present between the computer 56 in the remote service center 52 and the elevator control 26.

From all these presentation data 68 the technician can immediately gather whether the relevant elevator components are working and thus he can start to perform an automatic or manual rescue drive.

On this behalf, an I/O section "rescue drive" 120 is arranged in the right column of the display 58 which might be for example a touchscreen panel. In this case the display 58 may comprise in the rescue drive section 120 input fields, e.g. direction buttons 122, 124 for inputting intended moving direction of the car and a manual rescue button 60 which has to be pressed permanently as long as the elevator car 12 approaches the next landing 30. The rescue drive section 120 may also comprise an status indicator 121 telling the technician whether a rescue drive is possible or not.

The presentation data further comprises a real-time data section 130 which essentially comprises the car position data 76 with respect to the nearest landing in a graphic representation, the travelling direction 132 as well as the car speed 134 during the manual or automatic rescue drive. Finally, the real-time presentation data 130 may comprise a door zone indicator 136 showing when the elevator car has arrived at the landing zone and a door open indicator 138 showing that the car and landing doors are open so that the trapped passengers can be released.

It is apparent that with the information of the presentation data 68 the technician is able to perform a manual or automatic rescue drive without needing to gather himself too much information about the system details of the elevator and of the general elevator layout.

It is obvious from these presentation on the display 58 that the technician is effectively assisted in preparing and performing a rescue drive for releasing trapped passengers either from the location of the control panel 28 or from a remote service station 52 or from a mobile service device as e.g. a note book so that a release of trapped passengers via a rescue drive can be initiated immediately after a failure situation has been notified, e.g. to the remote service center 52. This greatly enhances passenger comfort and the confidence of passengers into the elevator system in general.

It is apparent that the invention is not restricted to the disclosed embodiment of the drawings but can be varied within the scope of the appended patent claims.

LIST OF REFERENCE NUMBERS 10 elevator system
11 elevator
12 elevator car
14 elevator pathway—elevator shaft
16 hoisting ropes—elevator ropes
18 elevator motor—traction sheave machine
20 counterweight
22 traction sheave
24 motor drive—elevator drive
25 safety circuit
26 elevator control
28 control panel—control cabinet
30 floor
32 floor door
34 car door
36 elevator brake 38 car load sensor
40 car position sensor
42 video camera
44 car audio interface
46 communication interface of elevator control
48 transmission line
50 public communication network
52 remote service center
54 client communication interface
56 service computer
57 rescue managing circuit
58 display
60 input device of service computer—push button—keyboard
68 presentation data
70 car data
72 graphic presentation of car position
74 car position data
76 next floor and distance data
78 car load data
80 balance data with assumed travel direction after brake release: up—neutral—down
90 status data
92 elevator system type
94 elevator motor type
96 elevator control type
98 elevator brake type
100 rescue manager type
102 backup power supply type with charging status
110 functional data of elevator component or elevator system
112 elevator component: data connection—mains—overspeed governor—safety circuit—elevator brake—motor+drive—rescue manager—elevator control
114 function indicator on: green—off: red
120 rescue drive interface
121 indicator: rescue drive possible
122 up-direction button on the touchscreen display for the car movement in manual rescue drive
124 down-direction button on the touchscreen display for the car movement in manual rescue drive
130 real time data for aiding rescue drive
132 travel direction of rescue drive
134 travel speed of rescue drive
136 door zone indicator
138 door open indicator

The invention claimed is:

1. A method for aiding or managing a rescue operation in an elevator system comprising at least one elevator having a car driving in an elevator runway having several floors, and an elevator control which gathers data of components of the elevator system and issues a failure signal in any case of a failure situation in the elevator system leading to a stop of the car between the floors, wherein the method comprises the steps of:

checking, based on first data of at least one first sensor, whether a person is trapped in the car;

based on the first data or manually, starting a rescue managing process, using a rescue managing circuit connected to the elevator control, the rescue managing process comprising a pre-rescue process in which following data is read from sensors and/or components of the elevator system:

car position data;

status data of the elevator system and of the elevator components; and functional data of the elevator system and/or of the elevator components, which functional data is obtained from the elevator control and/or from sensors connected to the elevator system;

from the car position, status and functional data, generating and displaying presentation data on a display connected to the rescue managing circuit and/or to the elevator control for preparing or performing a rescue drive to release the trapped passengers;

comparing the functional data of the elevator system and of the elevator components with stored reference values representing different types of failure situations in the elevator system; and from the comparison result, obtaining failure situation data, the failure situation data being generated as presentation data to be displayed on the display.

2. The method according to claim 1, wherein the status data comprise distance of the car to the closest floor.

3. The method according to claim 2, wherein the status data comprise at least one of the following data:

distance of the car to the closest floor,
car load,
elevator motor type,
position of the closest floor,
elevator drive type,
elevator rescue device type,
hosting machinery brake type,
charging status of a backup power supply, and
general layout of elevator system.

4. The method according to claim 2, wherein the first sensor data are at least one of the following data:

car load data,
car video data, and
car audio data.

5. The method according to claim 1, wherein the status data comprise at least one of the following data:

distance of the car to the closest floor,
car load,
elevator motor type,
position of the closest floor,
elevator drive type,
elevator rescue device type,
hosting machinery brake type,
charging status of a backup power supply, and
general layout of elevator system.

6. The method according to claim 5, wherein the first sensor data are at least one of the following data:

car load data,
car video data, and
car audio data.

7. The method according to claim 1, wherein the first sensor data are at least one of the following data:

car load data,
car video data, and
car audio data.

8. The method according to claim 1, wherein the functional data comprise functional data of at least one of the following elevator components:

elevator brakes,
motor drive,
elevator motor,
safety circuit,
floor doors,
car door,
mains input,
gripping device,
overspeed governor elevator control,
backup power supply, and
data connection.

9. The method according to claim 1, wherein the rescue managing process comprises a run-time rescue process aiding the release of trapped passengers by continuously obtaining real-time data on at least two of the following parameters:

car position,
car speed,
movement direction of the car,
distance to approaching floor,
reaching of landing zone, and
opening of car and floor doors,
the method further comprising the step of generating presentation data of the real-time data for being displayed in real-time on a display connected with the elevator control and/or with the rescue managing circuit.

10. The method according to claim 9, wherein based on the real-time data a signal is generated for dropping the elevator brakes and/or for energizing/de-energizing the motor drive.

11. The method according to claim 1, wherein a mobile device of the technician is connected to the elevator control and/or rescue managing circuit and the presentation data are displayed on a display of the mobile device.

12. The method according to claim 1, wherein the display is located in a remote service centre connected with the elevator control via a public communication network.

13. A elevator system, comprising at least one elevator having at least one car, driving in an elevator runway having several floors and an elevator control which gathers data of components of the elevator system and is configured to issue a failure signal in any case of a failure situation in the elevator system leading to a stop of the car between the floors, wherein the elevator system comprises a rescue managing circuit connected to the elevator control, wherein the elevator control is connected with at least one first sensor, informing of the presence of passengers in the car, whereby the rescue managing circuit is configured to be started either manually or dependent on a signal of the first sensor to read out following data from sensors and/or components of the elevator system:

car position data;
status data of the elevator system and of the elevator components; and
functional data of the elevator system and/or of the elevator components obtained from the elevator control and/or from sensors connected to the elevator system, wherein the rescue managing circuit is configured to generate presentation data out of the car position, status and functional data, and to transfer the presentation data on a display connected to the rescue managing circuit and/or to the elevator control for preparing or performing a rescue drive to release the trapped passengers, and wherein the rescue managing circuit comprises an analysis unit having a reference memory with reference values representing the functional data of the elevator components in correlation to different types of failure situation in the elevator system and a comparator configured to compare the actual functional data of the elevator components with the stored reference values to derive failure situation data, which is generated as presentation data to be displayed on the display.

14. The elevator system according to claim 13, wherein the rescue managing circuit is integrated in the elevator control.

15. The elevator system according to claim 13, wherein the status data comprise;
   distance of the car to the closest floor,
   car load,
   elevator motor type,
   position of the closest floor,
   elevator drive type,
   elevator rescue device type,
   hosting machinery brake type,
   charging status of a backup power supply, and
   general layout of elevator system.

16. The elevator system according to claim 13, wherein the first sensor is at least one of the following sensors:
   car load sensor,
   video camera in the car, and
   audio interface in the car.

17. The elevator system according to claim 13, wherein the functional data comprise functional data of at least one of the following elevator components:
   elevator brakes,
   motor drive,
   elevator motor,
   safety circuit,
   floor doors,
   car door,
   mains input,
   gripping device,
   overspeed governor
   elevator control,
   backup power supply, and
   data connection.

18. The elevator system according to claim 13, wherein the rescue managing circuit comprises a run-time module aiding the release of trapped passengers by continuously obtaining real-time data on at least two of the following parameters:
   car position,
   car speed,
   movement direction of the car,
   distance to approaching floor,
   reaching of landing zone, and
   opening of car and floor doors, wherein the run-time module of the rescue managing circuit is configured to generate presentation data from these parameters for being displayed on the display.

19. The elevator system according to claim 18, wherein the rescue managing circuit is connected to the elevator drive and/or to the elevator brake drive and which is configured to perform an automatic rescue drive based on the real-time data.

20. An elevator system configured to perform the method according to claim 1, said elevator system comprising at least one elevator having at least one car, driving in an elevator runway having several floors and an elevator control which gathers data of components of the elevator system and is configured to issue a failure signal in any case of a failure situation in the elevator system leading to a stop of the car between the floors,
   wherein the elevator system comprises a rescue managing circuit connected to the elevator control,
   wherein the elevator control is connected with at least one first sensor, informing of the presence of passengers in the car,
   whereby the rescue managing circuit is configured to be started either manually or dependent on a signal of the first sensor to read out following data from sensors and/or components of the elevator system:
      car position data;
      status data of the elevator system and of the elevator components; and
      functional data of the elevator system and/or of the elevator components obtained from the elevator control and/or from sensors connected to the elevator system,
   wherein the rescue managing circuit is configured to generate presentation data out of the car position, status and functional data, and to transfer the presentation data on a display connected to the rescue managing circuit and/or to the elevator control for preparing or performing a rescue drive to release the trapped passengers, and
   wherein the rescue managing circuit comprises an analysis unit having a reference memory with reference values representing the functional data of the elevator components in correlation to different types of failure situation in the elevator system and a comparator configured to compare the actual functional data of the elevator components with the stored reference values to derive failure situation data, which is generated as presentation data to be displayed on the display.

* * * * *